US011338224B2

(12) United States Patent
Subramanian et al.

(10) Patent No.: US 11,338,224 B2
(45) Date of Patent: May 24, 2022

(54) PHASE SEPARATION APPARATUS AND METHOD

(71) Applicant: Tata Consultancy Services Limited, Mumbai (IN)

(72) Inventors: Sivakumar Subramanian, Pune (IN); Arjun Kumar Pukkella, Pune (IN); Raviraju Vysyaraju, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 239 days.

(21) Appl. No.: 16/489,457

(22) PCT Filed: Jan. 15, 2018

(86) PCT No.: PCT/IB2018/050227
§ 371 (c)(1),
(2) Date: Aug. 28, 2019

(87) PCT Pub. No.: WO2018/158645
PCT Pub. Date: Sep. 7, 2018

(65) Prior Publication Data
US 2020/0009481 A1 Jan. 9, 2020

(30) Foreign Application Priority Data
Feb. 28, 2017 (IN) .............................. 201721006976

(51) Int. Cl.
*B01D 45/00* (2006.01)
*B01D 21/26* (2006.01)
(Continued)

(52) U.S. Cl.
CPC ....... *B01D 21/265* (2013.01); *B01D 17/0217* (2013.01); *B01D 45/16* (2013.01); *B07B 7/086* (2013.01)

(58) Field of Classification Search
CPC .. B01D 45/16; B01D 17/0217; B01D 21/265; B07B 13/10–11; B07B 7/086; B07B 7/0865
(Continued)

(56) References Cited

U.S. PATENT DOCUMENTS 1,516,926 A * 11/1924 Pardee .................... B07B 13/11
209/697
1,573,035 A * 2/1926 Blatch .................... B07B 13/11
209/634
(Continued)

FOREIGN PATENT DOCUMENTS

WO       WO-90/15256       12/1990

OTHER PUBLICATIONS

Rademacher in view of Richard Hillyer, "Power Washer's Guidebook: Cleaning in the Grain Belt: Grain Elevators and Silos," Cleaner Times, Aug. 2014, https://www.cleanertimes.com/magazine/cleaner-times-articles-2/power-washers-guidebook-cleaning-in-the-grain-belt-grain-elevators-and-silo (Year: 2014).*
(Continued)

*Primary Examiner* — T. Bennett McKenzie
(74) *Attorney, Agent, or Firm* — Finnegan, Henderson, Farabow, Garrett & Dunner, LLP

(57) ABSTRACT

This disclosure relates generally to phase separation, and more particularly, to a apparatus and a method for phase separation. In one example, the apparatus includes a spiral shaped body, split outlets and an adjustable splitter. The spiral shaped body includes an inlet portion to receive a mixture of phases associated with distinct effective masses, an outlet portion, and multiple helical turns stacked between the inlet and outlet portion. A portion of helical turns are twisted to form a twisted portion having opposite walls of a preceding helical turn turned relative to one another in
(Continued)

opposite directions. The split outlets are configured at walls of the preceding helical turn to withdraw the phases based on an effective mass of said phases. The adjustable splitter is movably configured at least a portion of a cross section of the spiral shaped body to facilitate separate withdrawal of the one or more phases of the mixture.

16 Claims, 5 Drawing Sheets

(51) Int. Cl.
  *B01D 17/02* (2006.01)
  *B01D 45/16* (2006.01)
  *B07B 7/086* (2006.01)
(58) Field of Classification Search
  USPC ......... 209/697; 95/269, 260–262, 267, 272; 96/61, 171, 177–178
  See application file for complete search history.

(56) References Cited

U.S. PATENT DOCUMENTS

| | | | | |
|---|---|---|---|---|
| 1,958,577 | A * | 5/1934 | Hirshfeld | B01D 45/12 55/355 |
| 1,959,736 | A * | 5/1934 | Rademacher | B07B 13/11 209/643 |
| 2,615,572 | A * | 10/1952 | Hodge | B07B 7/08 209/454 |
| 2,724,498 | A * | 11/1955 | Beresford | B07B 13/11 209/697 |
| 2,952,360 | A * | 9/1960 | Oberg | B03B 5/626 209/18 |
| 3,013,663 | A * | 12/1961 | Vane | B03B 5/626 209/133 |
| 3,319,788 | A * | 5/1967 | Reichert | B03B 5/26 209/493 |
| 3,371,784 | A * | 3/1968 | Conway | B03B 5/26 209/458 |
| 4,189,378 | A * | 2/1980 | Wright | B03B 11/00 209/459 |
| 4,614,580 | A * | 9/1986 | Giffard | B03B 5/626 209/459 |
| 4,747,943 | A * | 5/1988 | Giffard | B03B 5/626 209/459 |
| 4,795,553 | A * | 1/1989 | Giffard | B03B 5/626 209/459 |
| 5,248,421 | A | 9/1993 | Robertson | |
| 5,452,805 | A * | 9/1995 | Robertson | B03B 5/626 209/697 |
| 6,264,041 | B1 | 7/2001 | Niitti | |
| 7,686,170 | B2 * | 3/2010 | Palmer | B03B 5/626 209/362 |
| 2009/0214800 | A1 * | 8/2009 | Saito | C01B 32/162 427/577 |
| 2009/0301710 | A1 * | 12/2009 | Clem | E21B 17/22 166/242.1 |
| 2011/0186487 | A1 * | 8/2011 | Cooke | B03B 5/626 209/459 |
| 2014/0079573 | A1 * | 3/2014 | Pabst | F04B 43/084 417/412 |

OTHER PUBLICATIONS

Richard Hillyer, "Power Washer's Guidebook: Cleaning in the Grain Belt: Grain Elevators and Silos," Cleaner Times, Aug. 2014, available at https://www.cleanertimes.com/magazine/cleaner-times-articles-2/power-washers-guidebook-cleaning-in-the-grain-belt-grain-elevators-and-silos/. (Year: 2014).*

International Search Report dated May 9, 2018, in counterpart International Application No. PCT/IB2018/050227; 3 pages.

Written Opinion dated May 9, 2018, in counterpart International Application No. PCT/IB2018/050227; 5 pages.

* cited by examiner

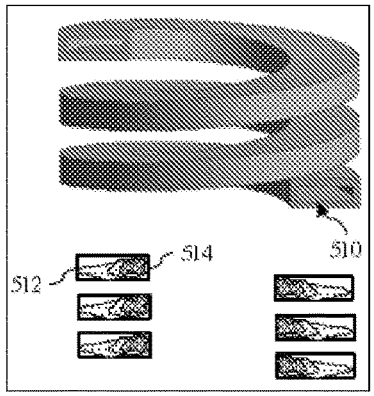
FIG. 5A

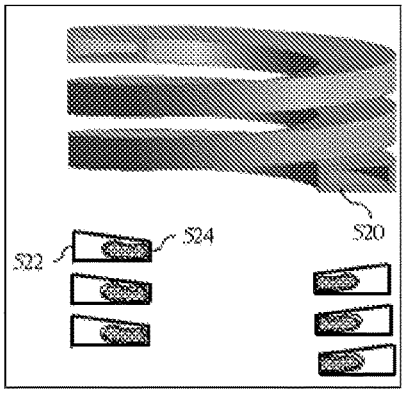
FIG. 5B

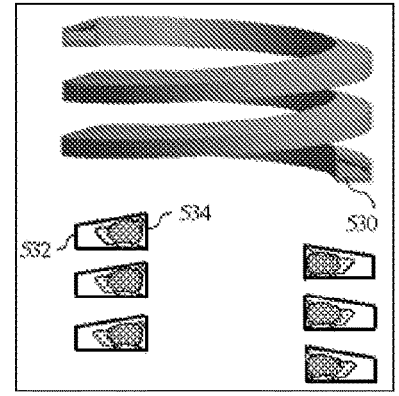
FIG. 5C

INTRODUCE, IN A PHASE SEPARATION APPARATUS, A MIXTURE HAVING A PLURALITY OF PHASES ASSOCIATED WITH DISTINCT EFFECTIVE MASSES, WHEREIN THE , THE PHASE SEPARATION APPARATUS INCLUDES A SPIRAL SHAPED BODY HAVING AN INLET PORTION, AN OUTLET PORTION AND A PLURALITY OF HELICAL TURNS STACKED BETWEEN THE INLET PORTION AND THE OUTLET PORTION, WHEREIN AT LEAST ONE PORTION OF ONE OR MORE HELICAL TURNS OF THE PLURALITY OF HELICAL TURNS BEING TWISTED TO FORM A TWISTED PORTION OF SAID HELICAL TURN; ONE OR MORE SPLIT OUTLETS AND AN ADJUSTABLE SPLITTER — 602

WITHDRAW SEPARATELY, FROM THE ONE OR MORE SPLIT OUTLETS OF THE PHASE SEPARATION APPARATUS, ONE OR MORE PHASES OF THE PLURALITY OF PHASES FROM THE PRECEDING HELICAL TURN BASED ON AN EFFECTIVE MASS OF SAID ONE OR MORE PHASES — 604

PHASE SEPARATION APPARATUS AND METHOD

CROSS REFERENCE TO RELATED PATENT APPLICATIONS AND PRIORITY

This application is a U.S. national phase application of International Application No. PCT/IB2018/050227, filed Jan. 15, 2018, which claims priority to Indian Application No. 201721006976, filed on Feb. 28, 2017. The entire contents of the aforementioned applications are incorporated herein by reference.

TECHNICAL FIELD

The embodiments herein generally relate to separation of phases of a mixture, and, more particularly, to a method and apparatus for phase separation where the apparatus for phase separation includes a spiral configuration.

BACKGROUND

Phase separation plays an important role in industrial processes associated with beneficiation. Conventionally, various phase separation technologies are available. For example, various technologies available for solid-liquid separation include sedimentation, Hydro-cyclone separators, mineral jigs, flocculation devices, thickeners, and so on. However, the conventional equipment and/or methods for phase separation suffer from limitations such as high capital cost, operational costs, maintenance cost, chemical dosage and scalabilities.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, embodiments herein provides a phase separation apparatus. The phase separation apparatus includes a spiral shaped body, one or more split outlets and an adjustable splitter. The spiral shaped body includes an inlet portion to receive a mixture of a plurality of phases associated with distinct effective masses, an outlet portion configured towards an end portion of the spiral shaped body, and a plurality of helical turns stacked between the inlet portion and the outlet portion. At least one portion of one or more helical turns of the plurality of helical turns is twisted to form a twisted portion of the said helical turn, such that the twisted portion of the helical turn includes opposite walls of said helical turn turned relative to one another in opposite directions. The one or more split outlets are configured at one or more walls of a preceding helical turn configured preceding to the said one or more helical turns to withdraw one or more phases from the plurality of phases based on an effective mass of said one or more phases. The adjustable splitter is movably configured within at least a portion of a cross section of the spiral shaped body to facilitate separate collection of the one or more phases of the mixture for withdrawal.

In an embodiment, the apparatus further includes one or more split inlets configured immediately after the twisted portion of the helical turn. The one or more split inlets facilitate in flushing the phases collected near an outer wall of the spiral apparatus. Particularly, the split inlets are used to introduce a flushing fluid, for example, water or air, to further push the phases and/or solids present in the mixture at said location towards inside of the spiral body so that a fresh competition between all the solids can be established.

In another embodiment, a method for phase separation is disclosed. The method includes introducing, in a phase separation apparatus, a mixture comprising a plurality of phases associated with distinct effective masses. Herein, the phase separation apparatus includes a spiral shaped body, one or more split outlets, and an adjustable splitter. The spiral shaped body includes an inlet portion to receive the mixture, an outlet portion configured towards an end portion of the spiral shaped body, and a plurality of helical turns stacked between the inlet portion and the outlet portion, wherein at least one portion of one or more helical turns of the plurality of helical turns is twisted to form a twisted portion of said helical turn. A twisted portion of a helical turn of the one or more helical turns includes opposite walls of a preceding helical turn turned relative to one another in opposite directions. The one or more split outlets configured at one or more walls of the preceding helical turn configured preceding to the twisted portion of the one or more helical turns. The adjustable splitter is movably configured at least a portion of a cross section of the spiral shaped body. Further, the method includes withdrawing separately, from the one or more split outlets of the phase separation apparatus, one or more phases of the plurality of phases from the preceding helical turn based on an effective mass of said one or more phases.

In an embodiment, a phase from the plurality of phases that is associated with a relatively lower effective mass is withdrawn from a split outlet configured at an outer wall of the one or more walls of the preceding helical turn. Additionally or alternatively, a phase that is associated with a relatively higher effective mass is withdrawn from a split outlet configured at an inner wall of the one or more walls of the preceding helical turn.

In an embodiment, the method further includes adjusting an adjustable splitter within at least a portion of a cross section of the spiral shaped body to facilitate separate collection of the one or more phases of the mixture for withdrawal. In an embodiment, the adjustable splitter is configured at the outlet portion of the spiral shaped body.

In an embodiment, the method further includes injecting a wash fluid in the one or more helical turns succeeding to the twisted portion through one or more split inlets configured at an outer wall of one or more helical turns configured succeeding to the twisted portion. On flushing the wash fluid through the split inlets, the phases are further focused towards inside of the helical turn, thus initiating an improved fresh competition between all the phases and/or particles to occupy the position towards the outer wall because of induced centrifugal force. The split inlets facilitate in initiating the improved fresh competition, and thus enhance the separation efficiency of the phase separation apparatus.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and modules.

FIGS. 5A, 5B and 5C each illustrates configurations of cross sections of spiral body of phase separation apparatus, in accordance with various example embodiments.

FIG. 6 illustrates a flow-diagram of a method for phase separation, in accordance with an example embodiment.

DETAILED DESCRIPTION

Figure 1A:
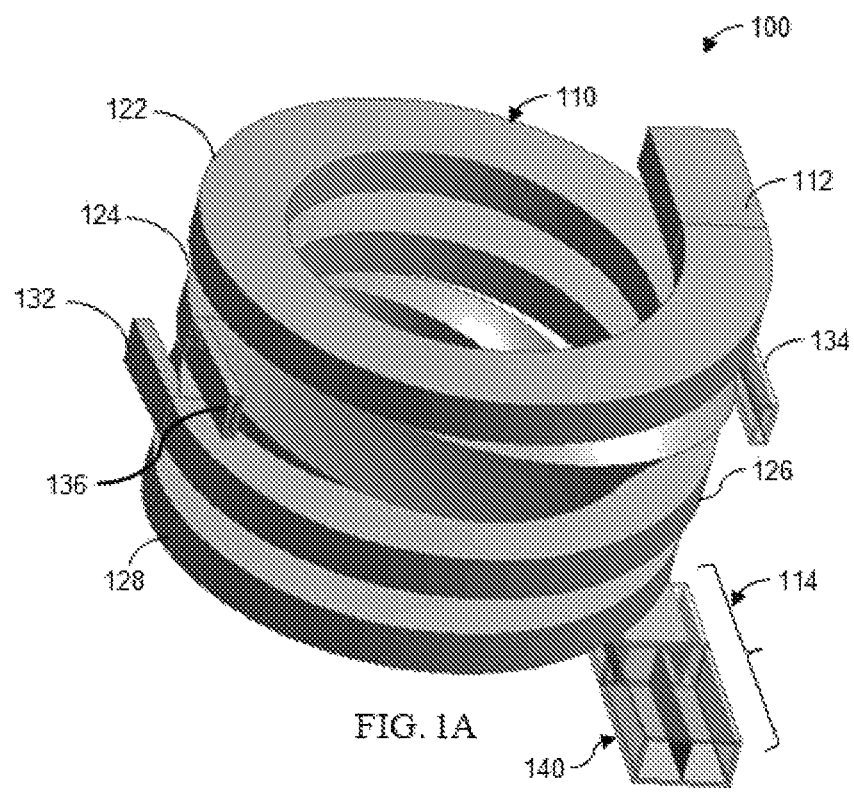
FIGS. 1A, 1B and 1C illustrate various views of a phase separation apparatus in accordance with an example embodiment.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any apparatus and methods similar or equivalent to those described herein can be used in the practice or testing of embodiments of the present invention, the preferred apparatus and methods are now described.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Typically, in industrial applications, huge amounts of multiphase mixtures requires to be treated and separated into streams that are selectively beneficiated to achieve a desired separation. Herein, the term 'phase' refers to various materials or ingredients of a mixture for instance that differ in density and/or size. Essentially, it is effective mass that can be exploited to achieve gravity based separation. It can be separating solid particles that differ in size, or density or in case of fluid-fluid systems that differ in density. Accordingly, the terms 'ingredients', 'materials' and 'phases' shall be used interchangeably throughout the description.

The separation of different phases from a mixture is utmost important in industrial processes. Generally, separation of ingredients or phases from mixtures, such as solid-liquid mixture or gas-liquid mixture is achieved by various conventional techniques. For example, current state of art for beneficiation of Iron slimes is by using selective flocculation with chemical dosing, cyclone separator, or by Wet High Intensity Magnetic Separator (WHIMS). All the above mentioned processes require high operational costs and investment costs. For instance, the process of selective flocculation for beneficiation requires pH conditioning, Flocculants, dispersants and modifiers for the operation to be carried out (i.e. chemical addition). However, said process is not fully established for handling different ores. Selective flocculation is not an efficient method of beneficiation for iron ores which are rich in Goethite. For example: Chemicals like caustic lye need to be added as a pH modifier, starch or gaur gam acts as flocculants.

The process of Wet high intensity magnetic separation (WHIMS) requires high magnetic intensity such as 10000-12000 gauss to enrich Iron ores because of paramagnetic nature of hematite ore present in it. However, said process is not an economically viable option for beneficiation of Iron ores because of high capital and operational costs.

Another conventional equipment is Cyclone Separator/Hydro-cyclones. Though hydro-cyclones are employed in industries for beneficiation of Iron ores, it is the overflow from the cyclone separators with a size fraction of −37 microns are discarded in to slime ponds. Hydro-cyclones are not effective for fine particles separation with higher industrial throughput ratios Based on the aforementioned discussion, it is seen that the conventionally techniques require high operational costs and investment costs.

Various embodiments disclosed herein provide an apparatus for phase separation in a manner that overcomes limitations of existing methods and apparatus used for separation of various phases such as solid-liquid separation, liquid-gas separation, liquid-liquid separation, and gas-solid separation. For example, the embodiments disclose a phase separation apparatus that includes a spiral body such that one or more turns of the spiral are followed by one or more twisted turns. When the mixture having multiple phases is passed through the spiral body of the phase separation apparatus, particles in the slurry experiences centrifugal force. When the mixture is subjected to pass through an inlet portion of the spiral body, the phases in the mixture experiences induced centrifugal force. Centrifugal force experienced by the particles is given by $$F = \frac{mv_\theta^2}{R},$$

where R is the radius of the curvature,
m is the mass of the particle which can also be expressed as:

$$m = \rho * \frac{4}{3}\pi r^3,$$

where, r is the radius of a particle (assumed to be spherical).

The phases that are associated with relatively higher effective mass experience more centrifugal force than the particles having relatively lower effective mass. Thus, the phases with relatively higher effective mass reach the outer periphery of the spiral turn sooner than the phases with relatively lower effective mass. Hence, the phases with relatively higher effective mass tends to collect towards an outer periphery of the spiral body while the particles/phases associated with relatively lower mass gets collected towards an inner periphery of the turns, hence leading to separation of phases. The separated phases can be separately withdrawn from the spiral apparatus. For example, the disclosed apparatus includes one or more split outlets on the periphery of the turns, for facilitating collection of the phase associated with corresponding effective mass. For example, in one embodiment, the apparatus may include splits configured towards an inner periphery or wall of the turns so as to collect phase associated with relatively lower effective mass. Additionally or alternately, the apparatus may include split outlets configured towards an outer periphery or wall of the turns so that phase associated with relatively higher effective mass can be collected from said outlets. As such the disclosed apparatus is not limited to separation of limited types of phases from the mixture. Instead, the disclosed apparatus can be utilized for separation of various phases from the mixture that may have phases of different effective mass. For instance, the apparatus can be utilized for solid-liquid separation, liquid-gas separation, liquid-liquid separation, and gas-solid separation.

Since upon withdrawal of the phase associated with higher effective mass, the remaining mixture again experience centrifugal force generated because of curved travel path and tends to approach the outer periphery. However, the lower effective mass phase that are now close to the outer periphery wall of the turn need an incentive to move inwards, leaving behind the higher effective mass concentrated stream near the outer periphery. In order to provide said incentive, the disclosed apparatus is configured to include a twisted helical turn at least immediately after (or adjacent to) a turn having the splits configured thereon. The twisted helical turn introduces a flow reversal, thereby introducing a fresh competition between higher effective mass phase and the lower effective mass phases of the mixture. The twisted helical turns may be repeated throughout the spiral body many times, thus giving a multistage effect to the separation of phases, and thereby leading to collection of enriched phases. Various embodiments of the disclosed phase separation apparatus is disclosed further in detail with reference to FIGS. 1A-5.

While aspects of described apparatus and method for mixing can be implemented in any number of different systems, utility environments, and/or configurations, the embodiments are described in the context of the following exemplary apparatuses.

Figure 1B:
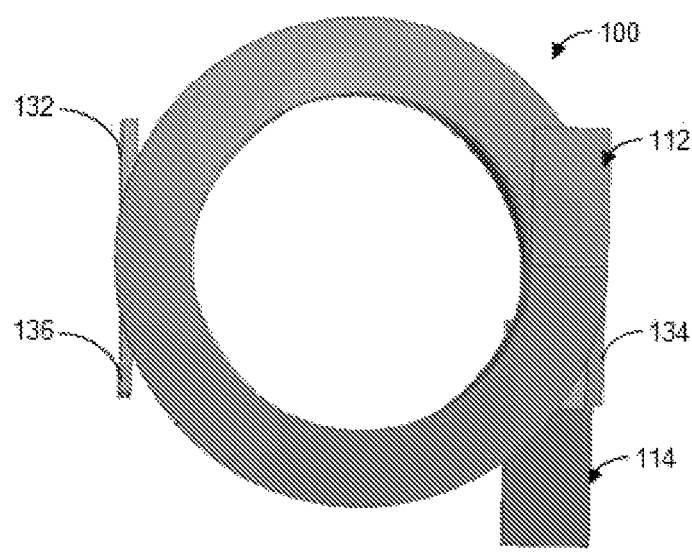
Figure 1C:
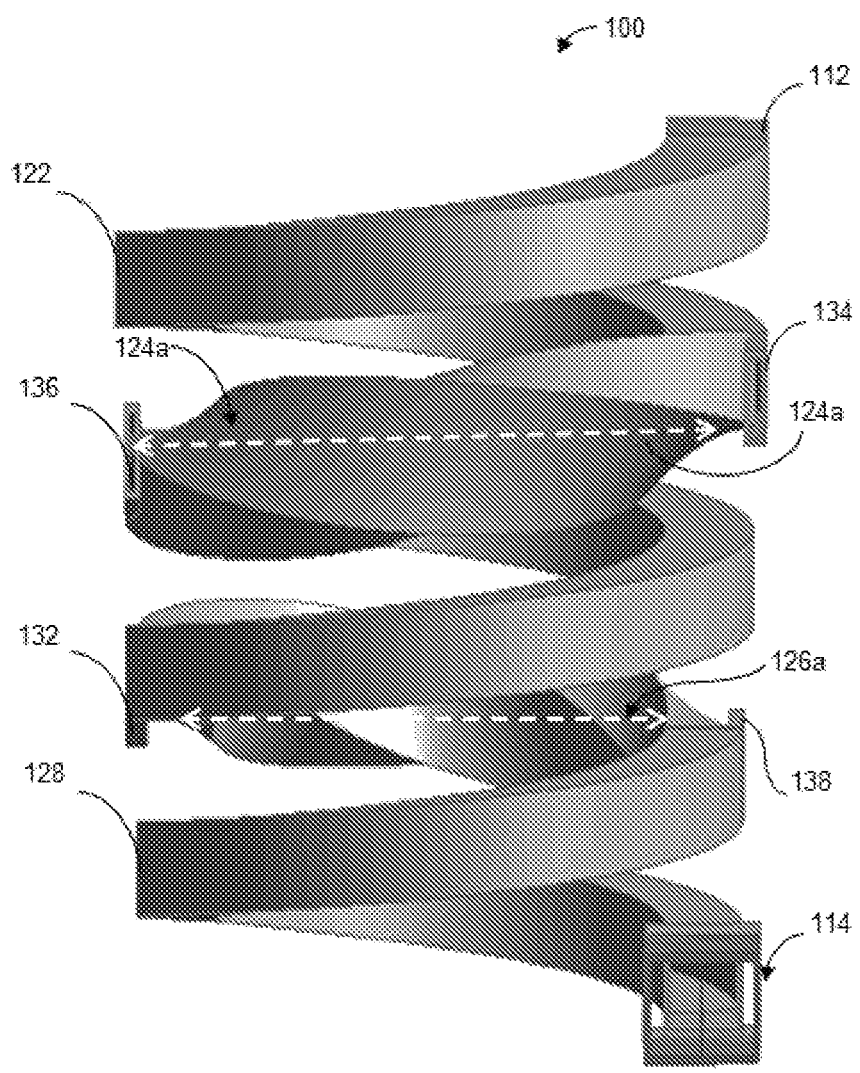

FIGS. 1A, 1B, 1C illustrate various views of a phase separation apparatus 100, in accordance with an example embodiment. For example, FIG. 1A illustrate a perspective view of the phase separation apparatus 100; FIG. 1B illustrate a top view of the phase separation apparatus 100; and FIG. 1C illustrate a front view of the phase separation apparatus 100.

Referring collectively to FIGS. 1A-1C, the phase separation apparatus 100 includes a spiral shaped body 110, one or more split outlets and an adjustable splitter 140. The spiral shaped body 110 includes an inlet portion 112 to receive a mixture of a plurality of phases associated with distinct effective masses, an outlet portion 114 configured towards an end portion of the spiral shaped body 110, and a plurality of helical turns such as turns (122, 124, 126, 128) stacked between the inlet portion 112 and the outlet portion 114. The mixture having a plurality of phases may include one of a solid-liquid phase mixture, a liquid-gas phase mixture, a liquid-liquid phase mixture, and a gas-solid phase mixture. The outlet portion 114 facilitates in withdrawing different phases of the mixture therefrom.

The plurality of turns 122, 124, 126, 128 are stacked between the inlet portion 112 and the outlet portion 114. An important contribution of the embodiments disclosed herein is that the plurality of helical turns includes one or more turns such that at least a portion of said one or more turns are twisted to form a twisted portion of the said helical turn. For example, a portion 124a of the helical turn 124 is twisted to form a twisted portion 124a of the helical turn 124. Similarly, a portion 126a of the helical turn 126 is twisted to form a twisted portion 126a of the helical turn 126. Herein, the twisted portion of a helical turn of the one or more helical turns includes opposite walls of a preceding helical turn turned relative to one another in opposite directions. For example, the twisted portion of the helical turn 124 is configured such that opposite walls of the preceding helical turn 122 are turned relative to one another in opposite directions in the twisted portion 124a. In the present description, the term 'preceding helical turn' refers to a helical turn which is immediately preceding a twisted helical turn. For example, in the spiral body 110, the turn 122 is the preceding helical turn corresponding to the twisted portion 124a of the helical turn 124. In an embodiment, the portion of the turn being twisted may be equal to almost half of the turn. The configuration of the twisted portion of the helical turn, for example the helical turn 124 is described further with reference to FIG. 2. Hereinafter, for the brevity of description, the term 'twisted portion of the helical turn' may further be referred to as 'twisted helical turn'.

Figure 2:
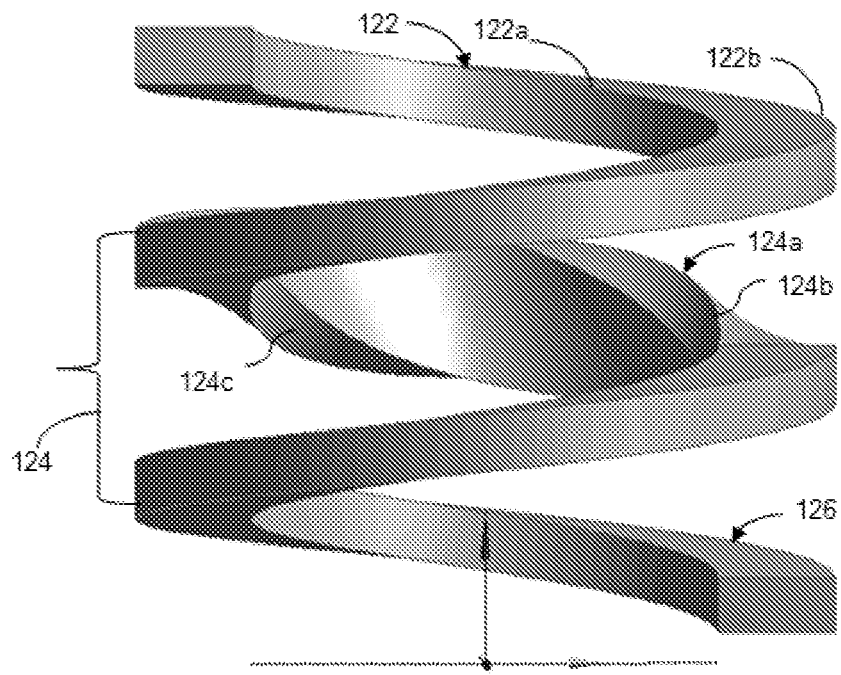
FIG. 2 illustrates expanded view of helical turns and twisted helical turn of a phase separation, in accordance with an example embodiment.

Referring now to FIG. 2, a portion of the apparatus 100 with the helical turns and a twisted helical turn is illustrated. In FIG. 2, the portion of the spiral shaped body is shown to include turns 122, 124 and 126. Herein, it will be noted that FIG. 2 is included to describe the configuration of twisted helical turn in the spiral body portion, and hence for the brevity of description, FIG. 2 is not shown to include other components of the apparatus 100.

As illustrated in FIG. 2, the preceding helical turn 122 includes an inner wall 122a and an outer wall 122b that are opposite to each other. The walls or opposing sides 122a, 122b of a preceding helical turn, for example the preceding helical turn 122 are turned relative to one another in opposite directions in the twisted helical turn 124a. For example, the opposite walls 122a, 122b of the preceding helical turn 122 are turned relative to one another in opposite directions and thus form walls 124b, 124c of the twisted helical turn 124. In the twisted portion 124a of the helical turn 124 that is next to the preceding helical turn 122, the inner wall 122a and the outer wall 122b continues to form an outer wall 124c and an inner wall 124b, respectively of the twisted helical turn 124.

Referring back to FIGS. 1A and 1B, the one or more split outlets, for example, split outlets 132, 134 are configured at one or more walls of the preceding helical turn. Particularly, the split outlets are configured prior to the start of the twisted portion of said one or more helical turns. The split outlets facilitate in withdrawing one or more phases from the plurality of phases based on an effective mass of said one or more phases. Herein, it will be noted that the preceding helical turn provides a path to the mixture to conclude separate into the phases associated with distinct effective masses, while the twisted helical turn facilitates in withdrawing at least one of the separated phases. The withdrawal of phases from the split outlets based on effective mass of said phases is described further in detail with reference to FIGS. 3A and 3B.

Figure 3A:
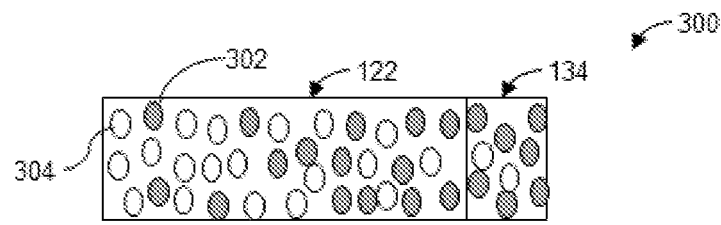
FIGS. 3A and 3B illustrate phase distribution of a mixture upon withdrawal of a phase from the split outlets of a phase separation apparatus.
Figure 3B:
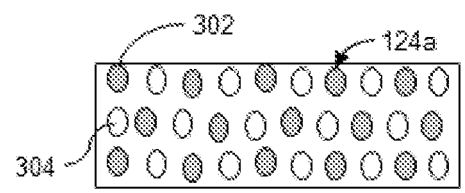

Referring now to FIGS. 3A and 3B, a cross-sectional representation of a portion of a helical turn, for example the helical turn 122 is illustrated. The cross sectional representation 300 is shown to include the split outlet 134 configured at an outer wall of the helical turn 122. When a mixture of two phases having particles such as particles 302 and 304 is passed through the helical turn 122, the phase that is associated with higher effective mass experience more centrifugal force than the phase having lesser effective mass. Assuming that the phase associated with the particles 302 has higher effective mass than the effective mass of the phase associated with the particles 304, phase associated with the particles 302 reaches an outer wall or periphery of the helical turn sooner than the phases associated with the particles 304. Hence, as illustrated in FIG. 3A, the phases with the particles 302 tends to collect towards an outer periphery of the spiral body while the particles/phases associated with the particles 304 is collected towards an inner periphery of the turns. The split outlet 134 configured on the periphery of the preceding turn facilitates collection of the phase associated with particles 302. It will be appreciated that a similar split outlet can be configured at an inner periphery of the turn 122 to collect the phase associated with the particles 304.

After removing the phase associated with the particles 302, the stream having lesser effective mass particles (which could not escape through the side stream) continues to travel in their current curvature path. Upon withdrawal of the phase associated with higher effective mass through the split outlet 134, the remaining mixture again experience centrifugal force generated because of curved travel path and tends to approach the outer periphery, as illustrated in FIG. 3B. However, the lower effective mass phase that are now close to the outer periphery wall of the turn need an incentive to move inwards, leaving behind the higher effective mass concentrated stream near the outer periphery. In order to provide said incentive, the disclosed apparatus 100 is configured to include a twisted spiral turn immediately after (or adjacent to) a turn having the splits configured thereon. The twisted helical turn 124a introduces a flow reversal, meaning thereby, reduces the number of lower effective mass particles concentration near the outer periphery, thereby introducing a fresh competition between higher effective mass phase and the lower effective mass phases of the mixture.

In an embodiment, the apparatus 100 includes one or more split inlets such as split inlets 136, 138 configured at an outer wall of one or more helical turns configured succeeding to the twisted portion, such as twisted portion turns 124a of the helical turn 124. Particularly, the split inlets are configured at an outer wall of the helical turn towards an end portion of the twist. The one or more split inlets 136, 138 are configured to inject a fluid, for example, water or air there through into a portion of the spiral turn immediately succeeding the twisted portion of the portion. Through the split inlet, wash fluid is flushed, that helps in further focusing the phases towards inside of the helical turn, thus initiating an improved fresh competition between all the phases and/or particles to occupy the position towards the outer wall because of induced centrifugal force. The split inlets facilitate in initiating the improved fresh competition, and thus enhance the separation efficiency of the apparatus 100. The split inlets may be particularly useful in case of mixtures having large amounts of solid phase. During flow reversal, i.e. upon passing the liquid through twisted portion of the turn, the solid phase can be accumulated in the spiral turn. However, in order to again make the solid phase move forward, a flush fluid such as air or water can be injected through the inlets.

Referring back to FIGS. 1A and 1B, the adjustable splitter 140 is movably configured at least a portion of a cross section of the spiral shaped body 110 to facilitate separate withdrawal of the one or more phases of the mixture. In an embodiment, the adjustable splitter 140 is configured in a longitudinal section of the outlet. For example as illustrated in FIG. 1A, the adjustable splitter 140 is configured in the longitudinal section of the outlet 114. In an alternate embodiment, the adjustable splitter 140 is configured in one or more longitudinal sections of the one or more helical turns of the body portion 110. A detailed cross sectional view of the adjustable splitter is illustrated and described further with reference to FIG. 4.

Figure 4:
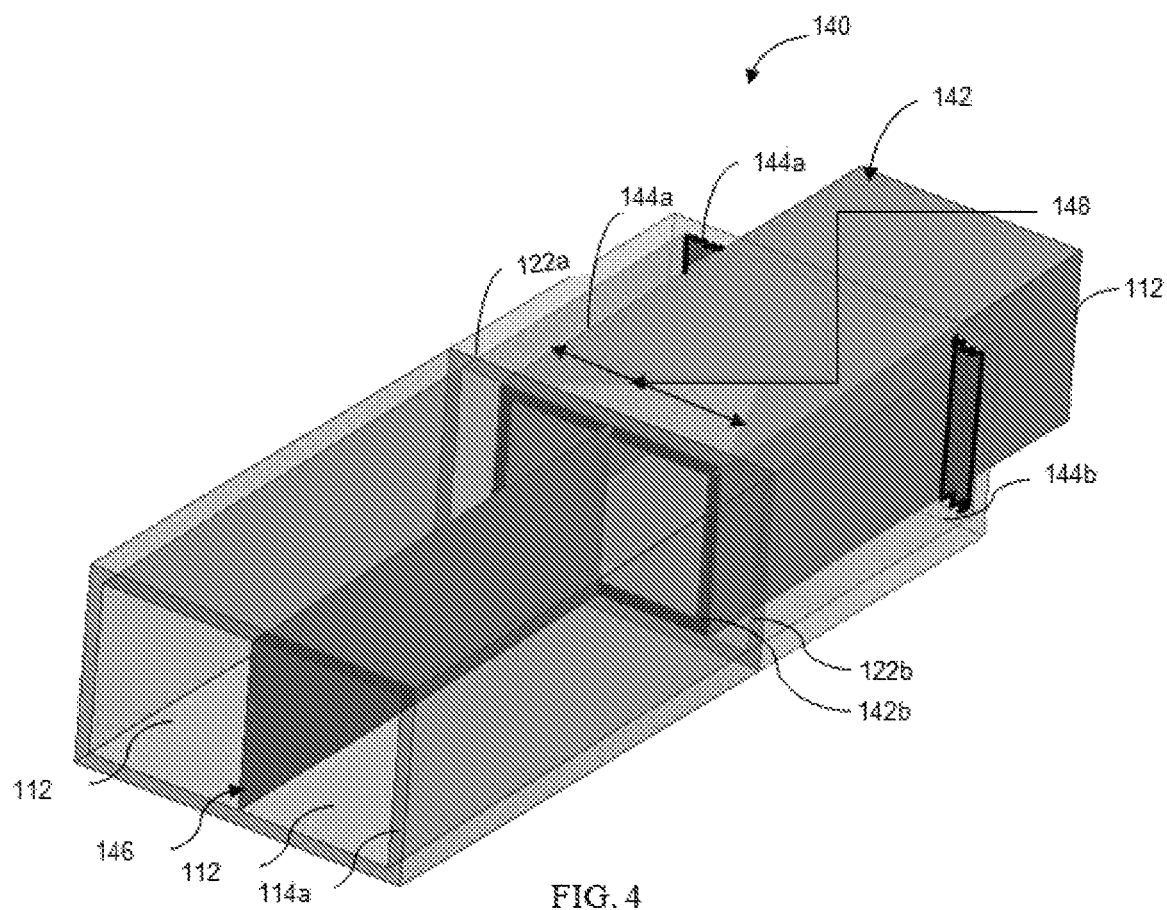
FIG. 4 illustrates a detailed cross sectional view of an adjustable splitter, in accordance with an example embodiment.

Referring now to FIG. 4, a cross sectional view of the adjustable splitter 140 is illustrated. The adjustable splitter 140 is configured along a longitudinal section of the outlet 114. The adjustable splitter 140 includes a separator unit 142, one or more bellows 144a, 144b, and one or more rigid dividers 146. The separator unit 142 is slidably configured in the longitudinal section of the outlet portion, and is capable of slidably moving in a horizontal direction (marked as 148) along the cross section of outlet portion. The separator unit 142 includes a geometry that maps with the cross section of the helical turn at the outlet portion. For example, for a trapezoidal cross section of the helical turn, the separator unit 142 may assume a trapezoidal cross section; for an inverted trapezoidal cross section of the helical turn, the movable splitter may assume an inverted trapezoidal cross section, and so on. In the present embodiment, for the sake of brevity of description and clarity of illustrations, the separator unit 142 is shown to include a rectangular cross-section with cuboidal shape.

The one or more bellows, for example, the bellows 144a and 144b are configured between the wall (for example, the wall 122a) of the outlet portion and a wall of the separator unit 142 to avoid escape of one or more phases. For example, the bellow 144a is configured between the wall 122a of the outlet portion 114 and a wall 142a of the separator unit 142. Similarly, a below 144b is configured between the wall 122b of the outlet portion 114 and a wall 142b of the separator unit 142. The bellows 144a, 144b serves the purpose of avoiding escape of one or more phases from the splitter and also offers least resistance to the motion of the movable separator unit 144. In an embodiment, material of the bellows includes elastic polymer, such as rubber.

The rigid divider 146 is configured within the cross section of, and towards a peripheral exit edge 114a of the outlet portion 114 to allow separate collection of the plurality of phases. In an embodiment, the position of the rigid divider 146 is fastened to the separator unit 142, and thus slidable movement of the separator unit 142 along the direction 148 enables sliding of the rigid divider 146. The collective sliding of the separator unit 142 along with the rigid divider 146 along the direction 148 divides the outlet cross-section into two portion, thereby enabling separate collection of phases therefrom, Herein, the collective sliding of the separator unit 142 along with the rigid divider 146 along the direction 148 may be referred to as sliding of the adjustable splitter 140.

In an embodiment, the adjustable splitter 140 may slide within the cross section of the spiral body so as to assume a position at a distance defined by a cut-off point of the mixture. The cut-off point is defined as a location on the width of the cross-section at which the volumetric fractions of multiple phases of the mixture are equal. For instance, towards a right side of the cut-off point location, the mixture may be dominant with heavier fraction phase (or the phase associated with higher effective mass), and towards a left side of the cut-off point, the location the stream may be dominant with lighter fraction phase (or the phase associated with lower effective mass).

In an embodiment, the cross-section of the turns of the spiral shaped body assumes a trapezoidal shape, such that an outer wall of the cross-section is bigger than an inside wall of the cross-section. In another embodiment, the cross-section of the turns of the spiral shaped body assumes an inverted-trapezoidal shape, such that the outer wall of the cross-section is smaller than the inside wall of the cross-section. In yet another embodiment, the cross-section of the spiral shaped body assumes a rectangular configuration such that the outer wall of the cross-section is substantially equal to the inside wall of the cross-section. The configurations of inner wall and the outer wall of the helical turns may form different types of cross sections thereof, as explained further with reference to FIGS. 5A-5C.

Referring now to FIGS. 5A-5C, various configurations of the cross section of helical turns along with contours of G force generated in said helical turns are illustrated. For example, FIG. 5A illustrates a rectangular cross section 510 along with corresponding contours of G force. The walls of the cross section 510, namely outer wall 512 and inner wall 514 are substantially equal. FIG. 5B illustrates trapezoidal cross section 520 along with corresponding contours of the G force. In case of trapezoidal cross section 520, an outer wall 522 of the cross-section is bigger than an inside wall 524 of the cross-section. The FIG. 5C illustrates an inverted trapezoidal 530 cross section along with corresponding contours of the G force. In case of trapezoidal cross section 530, an outer wall 532 of the cross-section is bigger than an inside wall 534 of the cross-section.

Herein, G force is computed as a ratio of centrifugal force developed and gravitational force, and is represented as:

$$G \text{ force} = \frac{mv^2}{r} \bigg/ mg$$

Due to difference in the G force experienced by the phases, concentration of each phase in the cross section varies. The G force is represented by a Froude number. As is shown in FIGS. 5A-5C, the inverted trapezoidal cross section shape (of FIG. 5C) of the turns helps in concentrating the Froude number generated towards the inner parallel edge as patches, while the other cross sectional shapes (such as rectangular cross-section 510 of FIG. 5A, trapezoidal cross-section of of FIG. 5A) has mildly distributed regions of the Froude number over the entire cross section. Similarly, referring to FIG. 5A, the G force has been well distributed over entire cross-section. So, particles in the entire region experience more force than compared with inverted trapezoidal and trapezoidal cross section shape geometries. Herein, it will be noted that for the disclosed apparatus 100, various shapes of cross-section are conceivable, for instance, rectangular, circular, elliptical, trapezoidal, inverted trapezoidal, and so on, according to the phases of the mixture, and hence the shape of the cross-section should not be construed as limiting to the disclosure.

An example of phase separation of a mixture by the disclosed apparatus is described herein. In the example, the mixture includes slime slurry. The slime slurry is passed through the inlet (for example the inlet portion 112 of the apparatus 100). The slurry may be passed at a velocity that is sufficient or optimum for an optimal separation of phases of a mixture. The particles in the slurry experiences centrifugal force. Due to a difference of the effective mass of the particles of the mixture, the centrifugal force experienced by the particles is different. For example, particles rich in oxides of iron by virtue of being having higher effective mass, experiences more centrifugal force than the particles containing gangue minerals (for example, Al, Si). Thus the particles rich in oxides of iron reach the outer wall of the spiral path sooner than the particles containing the gangue minerals. The Iron-rich ores concentrated stream can be collected from the outlets, such as outlets 132, 134, of the apparatus 100 of FIGS. 1A-1C. Alternatively, the lighter stream (or the stream containing the particles containing the gangue minerals) can be removed from the outlets configured on the inner side wall of the helical turns. The remaining stream, after removing the stream of particles rich in oxides or the stream of particles rich in particles containing the gangue minerals, is continued to travel further down the apparatus. It will be noted that the remaining stream is subjected to a forced flow reversal, meaning thereby that the remaining stream is made to pass through the twisted helical turns.

The particles in the slime slurry experience centrifugal force generated because of curved travel path and tend to approach the outer periphery, the alumina rich ores (lighter) particles which are close to the outer periphery wall doesn't see any incentive to move inwards, leaving behind the Iron ore concentrated stream near the outer periphery. So, by introducing the flow reversal there is again a fresh competition between the Iron and Alumina rich ores to travel from the inner wall to outer wall. As the Iron rich ores experiences more centrifugal force compared to that of the Al rich ores, it is expected to occupy outer wall first which is where we make another cut to collect the Iron ore rich stream. This is continued of several turns until the allowed percentage to Iron the cut stream which can be used as a feed stream in Iron production.

FIG. 6 illustrates a flow-diagram of a method 600 for phase separation, in accordance with an example embodiment. At 602, the method 600 includes introducing a mixture having a plurality of phases associated with distinct effective masses in phase separation apparatus. Herein, the phase separation apparatus may be the phase separation apparatus 100 described with reference to FIGS. 1A-5C. As described previously, the phase separation apparatus includes a spiral shaped body, one or more split outlets and an adjustable splitter. The spiral shaped body includes an inlet portion to receive the mixture, an outlet portion configured towards an end portion of the spiral shaped body, and a plurality of helical turns stacked between the inlet portion and the outlet portion. At least one portion of one or more helical turns of the plurality of helical turns is twisted to form a twisted portion of said helical turn. A twisted portion of a helical turn of the one or more helical turns includes opposite walls of a preceding helical turn turned relative to one another in opposite directions. The one or more split outlets are configured at one or more walls of the preceding helical turn configured preceding to the twisted portion of the one or more helical turns. The adjustable splitter is movably configured at least a portion of a cross section of the spiral shaped body.

Upon introducing the mixture in the phase separation apparatus, the phases of the mixture experiences centrifugal force. However, due to a difference of the effective mass of the phases of the mixture, the centrifugal force experienced by distinct phases is different. For example, the phases having higher effective mass, experiences more centrifugal force than the phases of relatively lower effective mass. Thus, the phases having relatively higher effective mass reach the outer wall of the spiral path presented by virtue of helical turns sooner than the phases containing the lower effective mass.

At 604, the method 600 includes withdrawing separately, from the one or more split outlets of the phase separation apparatus, one or more phases of the plurality of phases from the preceding helical turn based on an effective mass of said one or more phases. In an embodiment, withdrawing separately the one or more phases may include withdrawing a phase associated with a relatively lower effective mass of the distinct effective masses from a split outlet configured at an outer wall of the one or more walls of the preceding helical turn. Additionally or alternatively, a relatively higher effective mass of the distinct effective masses can be withdrawn from a split outlet configured at an inner wall of the one or more walls of the preceding helical turn.

Various embodiments provide phase separation apparatus that precludes addition of chemical agents to achieve beneficiation (as in selective flocculation). Also, the disclosed apparatus includes all static parts, with no moving parts. Also, the apparatus precludes need for external magnetic field for beneficiation thereby involving low capital costs with minimum operational and maintenance costs. As is explained in aforementioned description, the apparatus is proved to be effective for fine particles separation. The apparatus can handle higher through put without having to be manifold like hydro-cyclones, handling the higher flowrates is only limited by the pumping capacities but not on the equipment as it can stack in to parallel. Due to spiral configuration, the apparatus is scalable to meet the processing flowrates.

The disclosed apparatus has an ability to perform complete separation of solids from the fluid as well as it can classify the different solids fractions present in the fluid feed stream based on effective mass of the phases. The disclosed apparatus facilitates in providing direct access to the cut point location. The apparatus includes an adjustable splitter which slides past the pipe cross section, which gives separate streams of outer outlet and inner outlet. Accordingly, the apparatus facilitates in separate collection of phases of the mixture by means of different outlets configured at different widths of the cross section of the turns. It will be noted herein, that in different applications, the mixture can include more than two phases, and the apparatus may be caused to facilitate separate collection of said phases by means of different outlets configured at different widths of the cross section of the turns. The different widths may be determined based on the effective mass of the phases of the mixture. It will also be understood that the amount of phases collected can be different (and not necessarily equal).

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A phase separation apparatus, comprising:
    a spiral shaped body having:
        an inlet portion to receive a mixture of a plurality of phases associated with distinct effective masses;
        an outlet portion configured towards an end portion of the spiral shaped body; and
        a plurality of helical turns stacked between the inlet portion and the outlet portion, wherein at least one portion of one or more helical turns of the plurality of helical turns being twisted to form a twisted portion of said helical turn, the twisted portion of the one or more helical turns having opposite walls turned relative to one another in opposite directions;
    one or more split outlets configured at one or more walls of a preceding helical turn configured preceding to the twisted portion of the one or more helical turns to withdraw one or more phases of the plurality of phases from the preceding helical turn based on an effective mass of said one or more phases, and wherein the twisted portion of the one or more helical turns is configured to introduce a flow reversal and to provide a multi stage effect to separation of the one or more phases and wherein the twisted portion of the one or more helical turns introduces a fresh competition between a higher effective mass phase and a lower effective mass phase of a mixture; and
    an adjustable splitter movably configured within at least a portion of a cross section of the spiral shaped body to facilitate separate collection of the one or more phases of the mixture for withdrawal.

2. The apparatus of claim 1, wherein a split outlet configured at an outer wall of the one or more walls of the preceding helical turn facilitates in withdrawing a phase associated with a relatively higher effective mass of the distinct effective masses.

3. The apparatus of claim 1, wherein a split outlet configured at an inner wall of the one or more walls of the preceding helical turn facilitates in withdrawing a phase associated with a relatively lower effective mass of the distinct effective masses.

4. The apparatus of claim 1, wherein the cross-section of the spiral shaped body comprises an inverted trapezoidal shape, with an outer wall of the cross-section smaller than an inside wall of the cross-section.

5. The apparatus of claim 1, wherein the cross-section of the spiral shaped body comprises a trapezoidal shape, with an outer wall of the cross-section bigger than an inside wall of the cross-section.

6. The apparatus of claim 1, wherein the cross-section of the spiral body comprises a rectangular shape, wherein an outer wall of the cross-section is substantially equal to an inside wall of the cross-section.

7. The apparatus of claim 1, wherein the adjustable splitter is configured along a longitudinal section of the outlet portion, the adjustable splitter comprising:
    a separator unit slidably configured in the longitudinal section of the outlet portion and capable of slidably moving in a horizontal direction along the cross section of outlet portion;

one or more bellows fixedly configured in a gap configured by the outlet portion and the separator unit; and one or more rigid dividers configured within the cross section towards a peripheral exit edge of the outlet portion to allow separate collection of the plurality of phases.

8. The apparatus of claim 7, wherein the adjustable splitter is configured within the cross section such that the one or more rigid dividers are located at a distance defined by a cut-off point of the mixture.

9. The apparatus of claim 7, wherein material of the one or more bellows comprises elastic polymer.

10. The apparatus of claim 1, further comprising one or more split inlets configured at an outer wall of one or more helical turns configured succeeding to the twisted portion, the one or more split inlets configured to inject a wash fluid in the one or more helical turns succeeding to the twisted portion.

11. The apparatus of claim 1, wherein the phase separation of the mixture comprises phase-separation selected from the group consisting of solid-liquid separation, liquid-gas separation, liquid-liquid separation, and gas-solid separation.

12. A method for phase separation, the method comprising:

introducing, in a phase separation apparatus, a mixture comprising a plurality of phases associated with distinct effective masses, the phase separation apparatus comprising:

a spiral shaped body having an inlet portion to receive the mixture, an outlet portion configured towards an end portion of the spiral shaped body, and a plurality of helical turns stacked between the inlet portion and the outlet portion, wherein at least one portion of one or more helical turns of the plurality of helical turns being twisted to form a twisted portion of said helical turn, the twisted portion of the one or more helical turns having opposite walls turned relative to one another in opposite directions;

one or more split outlets configured at one or more walls of a preceding helical turn configured preceding to the twisted portion of the one or more helical turns, and wherein the twisted portion of the one or more helical turns is configured to introduce a flow reversal and to provide a multi stage effect to separation of the one or more phases and wherein the twisted portion of the one or more helical turns introduces a fresh competition between a higher effective mass phase and a lower effective mass phase of a mixture; and an adjustable splitter movably configured at least a portion of a cross section of the spiral shaped body; and withdrawing separately, from the one or more split outlets of the phase separation apparatus, one or more phases of the plurality of phases from the preceding helical turn based on an effective mass of said one or more phases.

13. The method of claim 12, wherein withdrawing separately the one or more phases comprises withdrawing a phase associated with a relatively lower effective mass of the distinct effective masses from a split outlet configured at an outer wall of the one or more walls of the preceding helical turn.

14. The method of claim 12, wherein withdrawing separately the one or more phases comprises withdrawing a phase associated with a relatively higher effective mass of the distinct effective masses from a split outlet configured at an inner wall of the one or more walls of the preceding helical turn.

15. The method of claim 12, further comprising adjusting the adjustable splitter within at least a portion of a cross section of the spiral shaped body to facilitate separate collection of the one or more phases of the mixture for withdrawal.

16. The method of claim 12, further comprising injecting a wash fluid in the one or more helical turns succeeding to the twisted portion through one or more split inlets configured at an outer wall of one or more helical turns configured succeeding to the twisted portion.

* * * * *